Patented Mar. 27, 1934

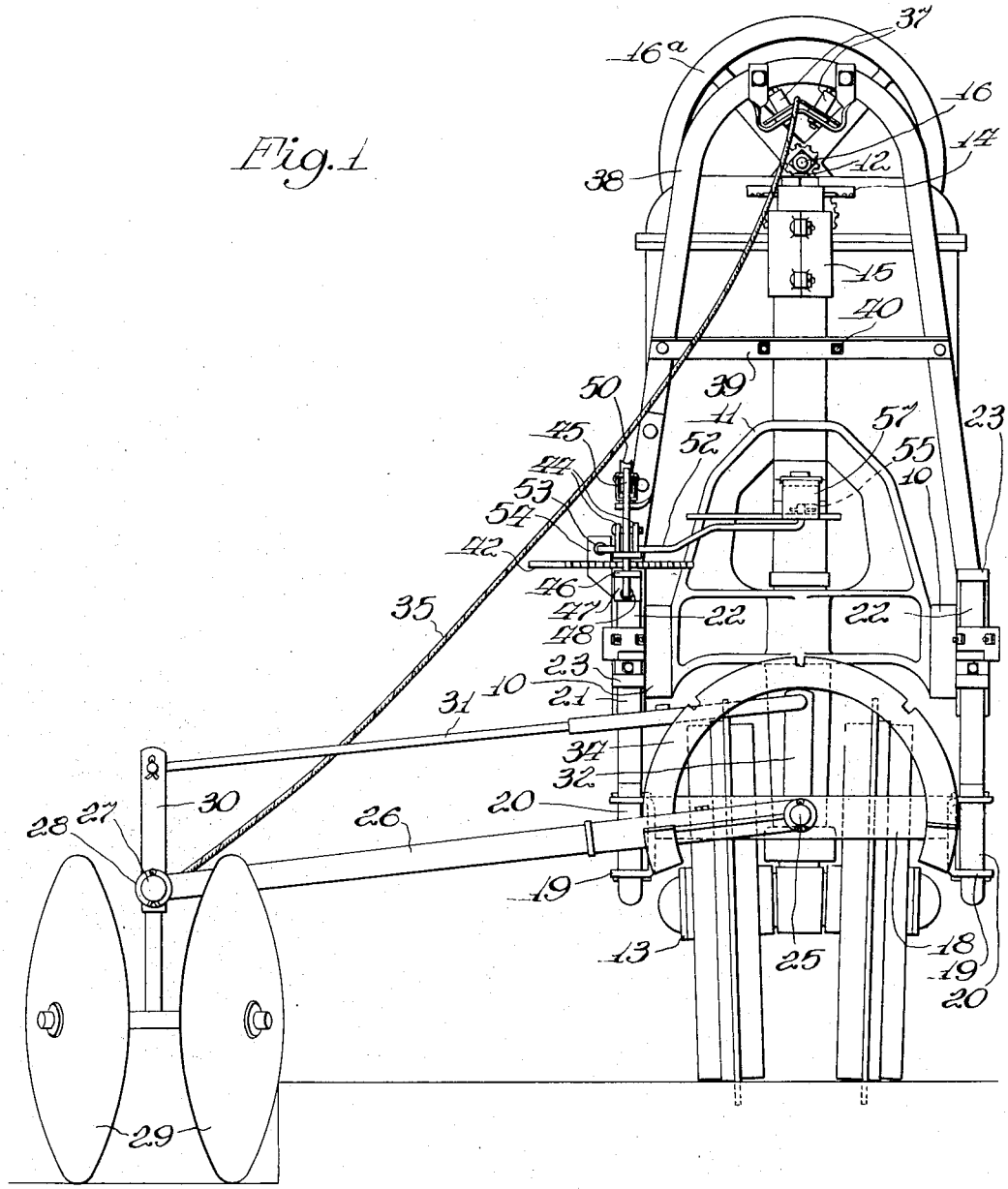

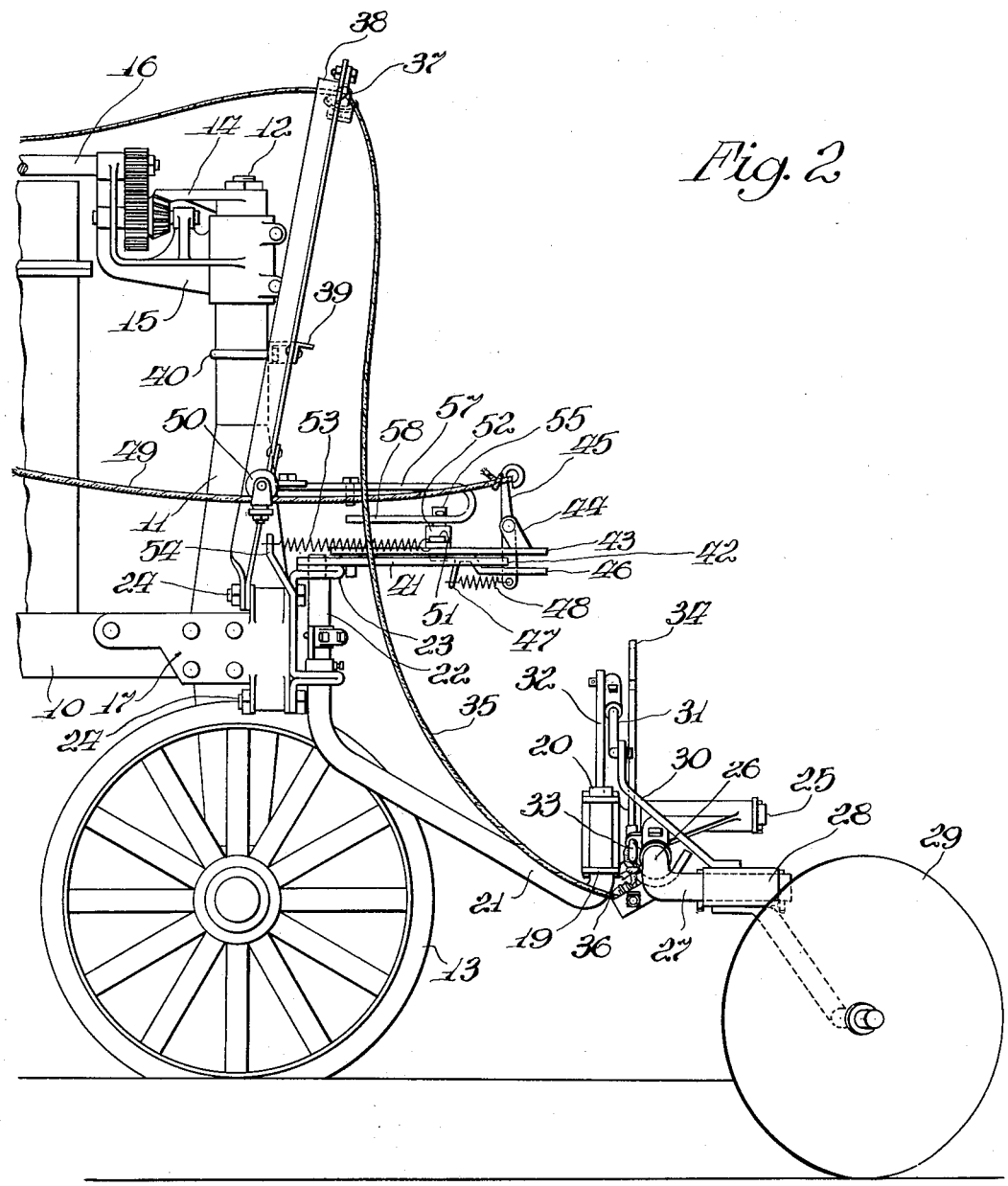

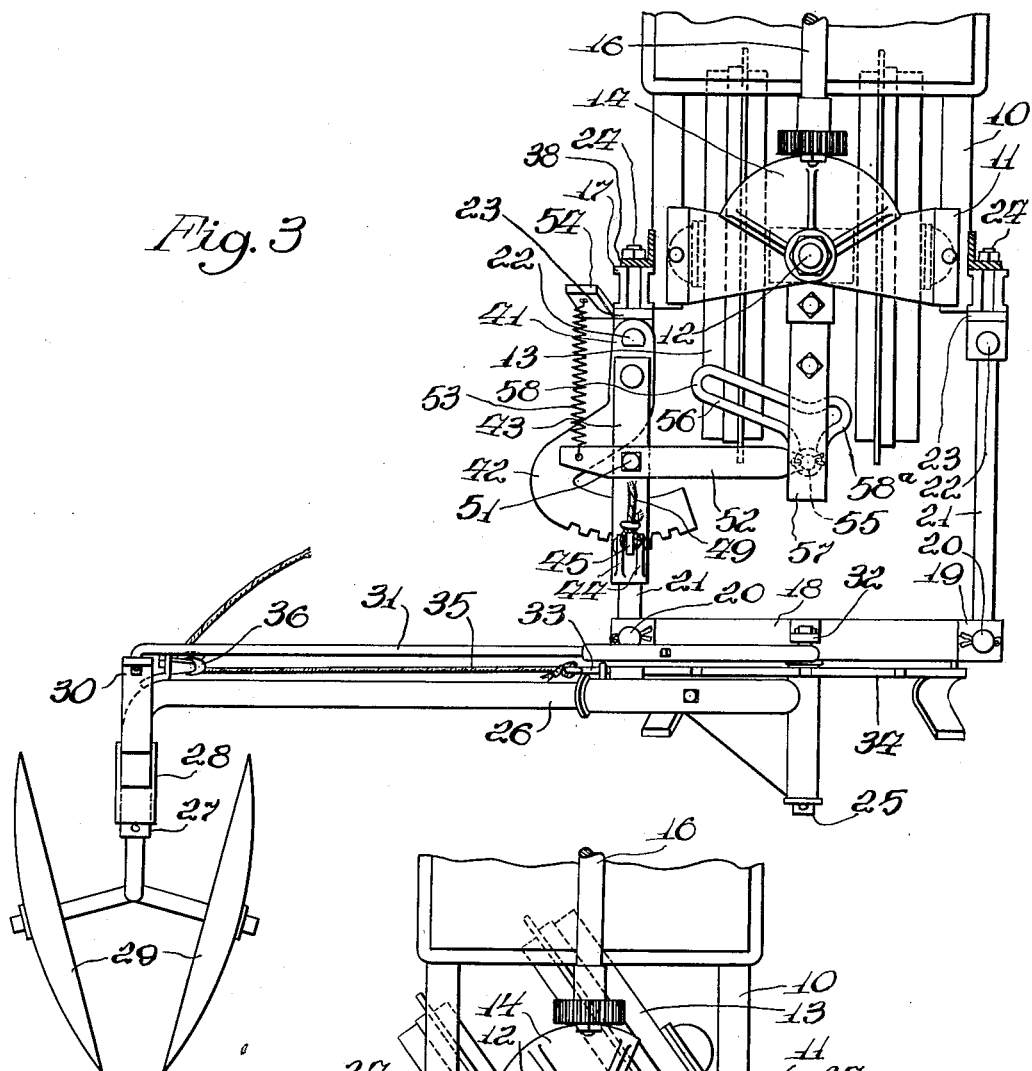

1,952,496

UNITED STATES PATENT OFFICE 1,952,496

FURROW GUIDE FOR TRACTORS

William S. Graham, Canton, Ill., assignor to International Harvester Company, a corporation of New Jersey Application January 6, 1933, Serial No. 650,424

9 Claims. (Cl. 97—49)

The present invention relates to automatic guiding or furrow following attachments for tractors, and more particularly for tractors of the socalled row-crop type having a narrow front steering truck turning about a vertical axis.

The main object of the invention is to provide a guiding device for tractors which will be close coupled but nevertheless exert sufficient leverage to be easy of actuation by the furrow engaged and efficient in its action on the truck or steering wheels of the tractor as well as adjustable from side to side of the tractor. Further objects are to provide for lateral adjustment of the guiding device while in operation to compensate for tractor drift, as in side hill work, and to provide for automatic release of the guiding device from the steering truck when the truck is steered by the operator of the tractor to make a short turn. Still another object is to provide a furrow following unit or device which will be maintained in upright position during vertical movements thereof.

The foregoing and other objects and advantages, which will be evident from the description to follow, are attained by the novel organization and details of construction hereinafter described and claimed, and illustrated on the accompanying drawings, where:

Figure 1 is a front view of a tractor and guide embodying the invention;

Figure 2 is a side view of the same, only the forward end of the tractor being shown;

Figure 3 is a top or plan view; and,

Figure 4 is a similar view with certain parts omitted, showing how the automatic steering connection is released to permit a short turn of the tractor.

The invention is disclosed in connection with a well known type of row-crop tractor, the front only of which is shown on the drawings. Such a tractor comprises a body frame 10 including a front caster or bolster 11 formed with central upright, tubular portions for reception of the vertical turning shaft 12 of a narrow tread steering truck 13. The upper end of the shaft 12 has a sector 14 secured to it, which is actuated through suitable gearing carried on a rearwardly extending bracket 15 by means of a steering shaft 16 extending to a control wheel 16ª (Figure 1) adjacent the operator's station at the rear of the tractor. At each forward corner, the tractor is provided with carrying brackets 17 formed with vertically spaced, longitudinally extending bolt seats, on which various implements and attachments may be mounted. In the present instance these brackets are made use of to support the automatic guiding attachment which will now be described.

This attachment is composed of a pilot head 18, which is shown as a transverse bar of substantially the same width as the tractor body and provided with vertical bearing lugs or brackets 19 at each end. These bearing brackets receive the forward upright pivot portions 20 of a pair of laterally swingable supporting members 21, which extend up to a level with the tractor body where they terminate in rear upright pivot portions 22 parallel to the portions 20. The upright pivot portions 22 are journaled in bearing brackets 23, which are secured by upper and lower bolts 24 to the brackets 17. The members 21 accordingly constitute forwardly and downwardly extending supporting means for maintaining the pilot head 18 in forwardly spaced relation to the tractor. The pilot head 18 is provided with a central, forwardly extending spindle 25, on which there is journaled the inner end of a laterally extending pilot boom 26 provided with a pivot portion 27 at its outer end extending parallel to the spindle 25. The pivot portion 27 of the boom has journaled thereon the bracket 28 of a furrow following device which is here shown as consisting of twin forwardly converging disks 29 designed to engage and follow a furrow in the manner indicated on Figure 1. The bracket 28 includes a rigid rearwardly and upwardly extending arm 30, which is pivotally connected by a longitudinally adjustable link 31 with a smaller rigid, upright arm 32 on the pilot head. On its rear side the boom 26 may be provided with a spring pressed latch 33 positioned to travel over an arcuate bar 34 on the pilot head and to engage in suitably positioned notches thereon for retaining the boom in elevated position when desired. The latch 33 is preferably controlled by means of a pull cord 35, which passes over a guide 36 on the outer end of the boom and then upwardly over guide pulleys 37 to the operator's station on the tractor. The pulleys 37 are carried on the upper portion of an arched frame member 38 which extends a little above the tractor and is secured to the brackets 17 by the same bolts which fasten the bearing brackets 23. In order to properly brace the arched frame 38, a cross-member 39 secured by a U-bolt 40 to the upright, tubular portion of the front bolster 11 may be provided. The upper end of one of the swingable supporting arms 21 has fixed to it a forwardly extending arm or member 41, which terminates as an arcuate rack sector 42 extending horizontally and transversely of the tractor. Near its rear end, the arm 41 has pivoted to it on a vertical axis a forwardly extending lever or link member 43, the front end of which extends slightly beyond the sector 42 where it is slotted and provided with a pair of lugs 44. Between these lugs there is pivoted a vertical pawl 45, the lower end of which passes through the slot in the lever 43 and through an aligned slot in a spaced carrier 46 secured to the under side of the lever 43 rearwardly of the sector 42 where it is provided with a downward lug 47 serving as a point of attachment for a coil spring 48 connected to the lower end of the pawl 45. The sector 42 extends between the lever 43 and the carrier 46 and is there engaged by the lower end of the pawl 45. The upper end of this pawl is provided with an eye to which a pull cord 49 is fastened. This cord preferably passes under a guide pulley 50 suitably mounted on the supporting frame 38 and extends to the operator's station on the rear of the tractor. A pull on the rope will release the pawl 45 from the sector 42 and permit the lever 43 to be moved angularly along the sector 42. The lever 43 has pivoted on it, as at 51, a connecting link 52. One end of this link extends beyond the pivot 51 where it has connected to it a coil spring 53 anchored to an upright lug or arm 54 carried by the adjacent bearing bracket 23. The other end of the connecting link 52, which is urged away from the tractor through the action of spring 53, is provided with a vertical latch pin 55 which normally engages in a latch seat or socket 56 formed in a re-bent under portion of a forwardly extending horizontal arm 57, which is fixed on the truck shaft 12 and is, therefore, movable therewith. The re-bent portion of the arm 57 is formed with lateral, slotted extensions 58 and 58a, which merge at their inner ends with the latch seat 56, and in which the latch pin 55 is adapted to move under certain conditions of operation. When the automatic guide is being used for plowing, as in the embodiment of the invention disclosed herein, the furrow following device will be at the right hand side of the tractor and short turns of the tractor will be made towards the left. For this reason the lateral extension 58 on the re-bent portion of arm 57 is made sufficiently long to allow for travel of the latch pin 55 when the truck is turned by the operator to effect short turning movement of the tractor, as shown by Figure 4.

The operation of the automatic guiding device above described will be as follows:

Under ordinary operating conditions the position of the various parts will be shown in Figures 1, 2 and 3 of the drawings. Under these conditions any lateral movement imparted to the pilot head through the action of the furrow wall on the guiding disks 29 will cause swinging movement of the supporting members 21 and corresponding movement of the member 41. This movement is in turn transmitted through the linkage composed of the lever 43 and connecting link 52 to the arm 57 and, therefore, to the truck, the wheels of which will be maintained in parallel relation to the furrow. At the end of the field, or when the operator desires to turn the tractor to the left, movement of the steering mechanism applied to the truck shaft 12 will cause the tension of spring 53 on link 52 to be overcome as the slotted arm 58 swing towards a position of substantial alignment with link 52, whereupon the latch pin 55 will leave the seat 56 and permit turning of the truck to the extreme position of Figure 4, if desired. As soon as the truck is straightened up, the latch pin 55 will again seat in the seat 56 and the automatic guiding action can be resumed. The shorter arm 58a permits normal steering to the right. When making a turn, the operator will, of course, elevate the pilot disks by a pull on the cord 35, which action will spring the boom 26 about its pivot 25 and cause the latch 33 to engage in one of the notches of the arcuate bar 34. A subsequent pull on the cord 35 will release the latch 33 and return the boom to its lowered position. In connection with the floating and lifting movements of the boom 26, it is to be noted that the manner of mounting the furrow following device on the boom is such that this device is maintained in upright position in all positions of the boom about its axis of movement, due to the parallel link connection 31. When it is desired to adjust the guide device in a manner to vary the relation of the line of travel of the tractor to the guiding furrow while the tractor is in operation, as may occur in side hill plowing, the operator will pull on the cord 49 to release the pawl 45, whereupon the distance between the furrow following element and the tractor may be increased to give the truck a slight angle towards the left, as when needed to overcome a tendency to drift down on the side hill.

It will accordingly be seen that the automatic guiding device of this invention is of simple and efficient construction and is so designed as to permit the necessary steering movements of the tractor to be effected without permanent disconnection of the device and also permit adjustment of the device with relation to the tractor to meet various conditions.

The preferred embodiment of the invention herein disclosed may be varied without departure from the scope of the invention as defined in the following claims.

What is claimed is:

1. The combination with a tractor of the type having a dirigible front truck having a shaft journaled on the front end of the tractor on a vertical axis, of a guiding attachment comprising a transversely extending pilot boom having a furrow following unit on its outer end, a pilot head pivotally supporting the inner end of said boom on a horizontal axis extending longitudinally of the tractor, a pair of laterally spaced supporting members extending downwardly and forwardly from the front end of the tractor and pivoted thereto on vertical axes at opposite sides of the truck, vertical pivotal connections between said members and the pilot head, said members constituting the sole means of support for the crosshead, and an actuating connection between one of said members and the truck shaft for imparting angular movements to the truck as said members are shifted.

2. The combination with a tractor of the type having a dirigible front truck with a vertical shaft journaled in the front end of the tractor, of a guiding attachment comprising a transversely extending pilot boom having a furrow following unit on its outer end, a pilot head pivotally supporting the inner end of said boom on a horizontal axis extending longitudinally of the tractor, a pair of laterally spaced supporting members extending forwardly from the tractor in parallel relation and provided with upright cylindrical portions at their opposite ends, upright bearing brackets on the tractor and pilot head in which said cylindrical portions of the supporting members are mounted for lateral swinging movement, a horizontal forwardly extending arm fixed to one of said cylindrical portions adjacent its mounting on the tractor, a similar arm on the truck shaft, and linkage pivotally connecting said arms for joint movement.

3. The combination with a tractor of the type having a dirigible front truck with a vertical shaft journaled in the front end of the tractor and control means on the tractor for turning the shaft to steer the tractor, of a guiding attachment comprising a pilot head, a furrow following device carried thereby, laterally swingable means for supporting the pilot head in forwardly spaced relation to the tractor including a supporting member having an upstanding pivot portion, a bearing bracket on the front of the tractor receiving said pivot portion, a horizontal arm fixed to said pivot portion, a similar arm fixed on the truck shaft and normally extending in parallel relation to the first named arm, and connecting means between said arms for normally causing steering movements of said truck shaft by lateral movements of the pilot head including a coupling releasable from one of said arms through actuation of the steering control means on the tractor.

4. The combination with a tractor of the type having a dirigible front truck with a vertical shaft journaled in the front end of the tractor and control means on the tractor for turning the shaft to steer the tractor, of a guiding attachment comprising a pilot head, a furrow following device carried thereby, laterally swingable means for supporting the pilot head in forwardly spaced relation to the tractor including a supporting member having an upstanding pivot portion, a vertical bearing bracket on the front of the tractor in laterally spaced relation to the shaft of the steering truck for receiving said pivot portion, a forwardly extending arm fixed to said pivot portion, a similar arm on the truck shaft having its outer portion formed with a latching seat, and a spring held coupling link pivoted on the first named arm and provided with means on its free end for releasably engaging said latching seat to normally connect said arms for movement in unison thereby steering the truck.

5. The combination with a tractor of the type having a dirigible front truck with a vertical shaft journaled in the front end of the tractor and control means on the tractor for turning the shaft to steer the tractor, of a guiding attachment comprising a pilot head, a furrow following device carried thereby, laterally swingable means for supporting the pilot head in forwardly spaced relation to the tractor including a supporting member having an upstanding pivot portion, a vertical bearing bracket on the front of the tractor in laterally spaced relation to the shaft of the steering truck for receiving said pivot portion, a forwardly extending arm fixed to said pivot portion, a similar arm on the truck shaft having its outer portion formed with a latching seat and with a guide slot extending laterally at one side of said seat, a spring held coupling link pivoted on said first named arm and provided with a latch pin at its free end for releasably engaging said seat and movable in said slot when released, said link and pin normally connecting the arms for movement in unison to steer the truck by movement of the pilot device, and said pin being released from its seat by independent steering movements imparted to the truck shaft through the steering control means on the tractor.

6. The combination with a tractor of the type having a dirigible front truck with a vertical shaft journaled in the front end of the tractor and control means on the tractor for turning the shaft to steer the tractor, of a guiding attachment comprising a pilot head, a furrow following device carried thereby, laterally swingable means for supporting the pilot head in forwardly spaced relation to the tractor including a supporting member having an upstanding pivot portion, a vertical bearing bracket on the front of the tractor in laterally spaced relation to the shaft of the steering truck for receiving said pivot portion, a forwardly extending arm fixed on said pivot portion having a horizontal rack sector thereon, a forwardly extending arm fixed on the truck shaft, a horizontal lever pivoted on the first named arm having a latch cooperating with said sector for adjustment thereon, and a link pivotally connecting said lever with the arm on the truck shaft.

7. The combination with a tractor of the type having a dirigible front truck journaled on a vertical axis and means on the tractor for turning the truck to steer the tractor, of a guiding attachment comprising a pilot head, a furrow following device carried thereby, laterally swingable means for supporting the pilot head in forwardly spaced relation to the tractor including a supporting member having an upstanding pivot portion journaled on the tractor in laterally offset relation to the turning axis of the truck, a horizontal rack sector fixed to said pivot portion, a horizontal arm movable with the truck, and pivotally connected members pivoted to said sector and to said arm including latch mechanism for adjusting said members along said sector to vary the distance between the sector and the horizontal arm.

8. The combination with a tractor of the type having a dirigible front truck journaled on a vertical axis and means on the tractor for turning the truck to steer the tractor, of a guiding attachment comprising a pilot head, a furrow following device carried thereby, laterally swingable means for supporting the pilot head in forwardly spaced relation to the tractor including a supporting member having an upstanding pivot portion journaled on the tractor in laterally offset relation to the turning axis of the truck, a short forwardly extending arm fixed to said pivot portion, a similar forwardly extending arm on the truck lying in the same horizontal plane as said short arm, and linkage connecting said arms including automatically extensible means for allowing turning movement of the truck beyond the range of movement of said short arm.

9. The combination with a tractor having dirigible front wheels, of a guiding attachment comprising a pilot head, laterally swingable means for supporting the pilot head in forwardly spaced relation to the tractor, means connecting said laterally swingable means and the dirigible wheels for movement in unison, a laterally extending pilot boom having its inner end pivotally mounted on said head on a horizontal axis extending longitudinally of the tractor, a pivot member parallel with said axis on the outer end of the boom, a furrow following device mounted on said pivot member and provided with a vertical arm extending above the pivot member, a vertical arm on the pilot head, and a link pivotally connecting said arms.

WILLIAM S. GRAHAM.